United States Patent
Clifford

(10) Patent No.: US 8,812,874 B1
(45) Date of Patent: Aug. 19, 2014

(54) CONTENT DEDUPLICATION IN ENTERPRISE RIGHTS MANAGEMENT

(75) Inventor: Thomas G. Clifford, Edina, MN (US)

(73) Assignee: Symantec Corporation, Mountain View, CA (US)

( * ) Notice: Subject to any disclaimer, the term of this patent is extended or adjusted under 35 U.S.C. 154(b) by 1195 days.

(21) Appl. No.: 12/415,699

(22) Filed: Mar. 31, 2009

(51) Int. Cl.
*G06F 11/30* (2006.01)
*G06F 21/62* (2013.01)
*G06F 17/30* (2006.01)

(52) U.S. Cl.
CPC ...... *G06F 21/6209* (2013.01); *G06F 17/30156* (2013.01)
USPC ............................................ 713/193; 726/30

(58) Field of Classification Search
CPC .......... G06F 11/1453; G06F 17/30156; G06F 3/0641; G06F 3/0608; G06F 3/067; G06F 21/10; G06F 21/105; G06F 21/31; G06F 21/60; G06F 21/602; G06F 21/62; G06F 21/6209; G06F 21/6218; G06F 21/6272
USPC ............ 713/189, 156–158, 193; 726/2–7, 10, 726/26–27, 30; 380/277, 286, 44; 707/661, 707/664, 692, 802, 693, 822, 737; 711/162, 711/170, 161, 216; 705/50–53, 59
See application file for complete search history.

(56) References Cited

U.S. PATENT DOCUMENTS

| | | | |
|---|---|---|---|
| 5,813,008 A * | 9/1998 | Benson et al. | 1/1 |
| 5,990,810 A * | 11/1999 | Williams | 341/51 |
| 6,983,365 B1 | 1/2006 | Douceur | |
| 7,266,689 B2 | 9/2007 | Douceur | |
| 7,356,701 B2 * | 4/2008 | Margolus et al. | 713/176 |
| 7,783,604 B1 * | 8/2010 | Yueh | 707/640 |
| 7,797,279 B1 * | 9/2010 | Starling et al. | 707/641 |
| 7,822,939 B1 * | 10/2010 | Veprinsky et al. | 711/170 |
| 7,849,065 B2 | 12/2010 | Kamani | |
| 7,908,436 B1 * | 3/2011 | Srinivasan et al. | 711/114 |
| 7,913,309 B2 | 3/2011 | Starostin | |
| 7,934,266 B2 * | 4/2011 | Yamauchi et al. | 726/30 |
| 8,041,074 B2 | 10/2011 | Rhoads | |
| 8,055,618 B2 | 11/2011 | Anglin | |
| 8,121,198 B2 | 2/2012 | Thambiratnam | |
| 8,141,129 B2 | 3/2012 | Ray | |

(Continued)

OTHER PUBLICATIONS

"The Challenges of Deploying Information Rights Management Across the Enterprise," EMC Corp., 2008.

(Continued)

*Primary Examiner* — Saleh Najjar
*Assistant Examiner* — Eric W Shepperd
(74) *Attorney, Agent, or Firm* — Meyertons Hood Kivlin Kowert & Goetzel

(57) ABSTRACT

A system and method is disclosed for implementing an enterprise rights management (ERM) system that enables effective data deduplication of ERM-protected data. An ERM-aware application may segment data, such as a file, into one or more data segments. The chosen segmentation boundaries may depend on data already stored on a target storage system and/or on a segmentation scheme used by a target deduplication system. An ERM-aware application may derive a respective convergent encryption key for each data segment, the convergent encryption key being dependent on the contents of the data segment, and encrypt the data segment using that key. The ERM-aware application may include the respective convergent decryption keys (which may be identical to the respective convergent encryption keys) in a publishing license of the ERM-protected file.

17 Claims, 5 Drawing Sheets

(56) References Cited

U.S. PATENT DOCUMENTS

| | | | |
|---|---|---|---|
| 8,156,092 | B2 | 4/2012 | Hewett |
| 8,229,903 | B2 * | 7/2012 | Baffes et al. .................. 707/694 |
| 8,244,691 | B1 * | 8/2012 | Ramarao ....................... 707/692 |
| 8,590,028 | B2 * | 11/2013 | Saxena et al. ..................... 726/9 |
| 2004/0034786 | A1 * | 2/2004 | Okamoto et al. ............. 713/189 |
| 2005/0187794 | A1 * | 8/2005 | Kimak .............................. 705/3 |
| 2007/0014360 | A1 | 1/2007 | Botzko |
| 2007/0189539 | A1 * | 8/2007 | Kim et al. ...................... 380/277 |
| 2008/0115224 | A1 * | 5/2008 | Jogand-Coulomb et al. ... 726/27 |
| 2008/0172430 | A1 * | 7/2008 | Thorstensen ................. 707/206 |
| 2008/0178299 | A1 * | 7/2008 | Merkle et al. ................... 726/29 |
| 2008/0243879 | A1 * | 10/2008 | Gokhale et al. ............... 707/100 |
| 2009/0010437 | A1 * | 1/2009 | Takashima et al. ........... 380/277 |
| 2009/0041237 | A1 * | 2/2009 | Takashima et al. ............. 380/44 |
| 2009/0063528 | A1 * | 3/2009 | Yueh ............................. 707/101 |
| 2009/0268903 | A1 * | 10/2009 | Bojinov et al. ................. 380/45 |
| 2009/0271402 | A1 * | 10/2009 | Srinivasan et al. ................ 707/6 |
| 2009/0319772 | A1 * | 12/2009 | Singh et al. ................... 713/153 |
| 2009/0327625 | A1 * | 12/2009 | Jaquette et al. ............... 711/160 |
| 2009/0328134 | A1 * | 12/2009 | Ray et al. .......................... 726/1 |
| 2010/0198797 | A1 * | 8/2010 | Wideman ..................... 707/692 |

OTHER PUBLICATIONS

"Secure Data Deduplication," Storer et al., Oct. 31, 2008.
"Technical Overview of Microsoft Windows Rights Management (RM) in the Enterprise," Microsoft Corp., Feb. 2003.
"Data Loss Prevention," Prathaben Kanagasingham, Aug. 15, 2008.
U.S. Appl. No. 12/240,405, filed Sep. 29, 2008.
U.S. Appl. No. 12/415,577, filed Mar. 31, 2009.
U.S. Appl. No. 12/058,833. filed Mar. 31, 2008.
U.S. Appl. No. 12/413,801, filed Mar. 3, 2009.
U.S. Appl. No. 12/413,821, filed Mar. 3, 2009.

\* cited by examiner

CONTENT DEDUPLICATION IN ENTERPRISE RIGHTS MANAGEMENT

BACKGROUND OF THE INVENTION

1. Field of the Invention

This invention relates to the operation of Enterprise Rights Management systems and more specifically, to enabling deduplication in an Enterprise Rights Management system.

2. Description of the Related Art

Organizations often maintain and handle sensitive data using computer systems and networks. Such data may be considered sensitive from a business and/or legal standpoint. For example, an organization such as a legal department may maintain confidential legal documents on its systems.

Enterprise Rights Management (ERM) systems may be used to protect sensitive data from unauthorized access. In such systems, a file (or part of a file) that contains sensitive information may be encrypted and the encrypted data associated with one or more access rights. Various strong encryption algorithms may be used by ERM systems to perform this encryption such that a user that obtains the ERM-protected, encrypted file cannot decipher its contents without the proper decryption key. Encrypted data may be referred to herein as cipher text.

In some ERM systems, a user may assign access rights to data using a publishing license. The publishing license may be combined with cipher text to produce ERM-protected data, which can only be accessed according to the access permissions.

ERM-protected data may be stored alongside unprotected data on various storage systems. In some storage systems, such as backup storage systems or storage service systems, it may be desirable to reduce the amount of storage space required to store the data by deduplicating redundant data. For example, a storage client may be configured to detect an attempt to store data to a storage system that already holds a copy of the data. In response to detecting this, one example storage client may be configured to not copy the data to the storage system, but instead, to register its interest in the data with the storage system. Thus, with deduplication, only a single copy of the data is stored on the system at any given time, thereby reducing the storage space requirements for storing the data.

SUMMARY

In various embodiments, an enterprise rights management (ERM) system may be configured to enable data deduplication of ERM-protected data. According to some embodiments, an ERM-aware application may segment data (e.g., a file) into one or more segments and encrypt each data segment using a respective convergent encryption key that is dependent on the contents of the data segment. The ERM-aware application may store a respective decryption key for each data segment in a publishing license associated with the data. In some embodiments, the respective encryption key of each segment may be identical to its respective decryption key.

In some embodiments, the particular segmentation applied to the data may depend on deduplication boundaries. For example, an ERM-aware application may query a deduplication system to discover which portions of the data are redundant and base its own segmentation boundaries on such data. In other embodiments, fixed segmentation boundaries may be used.

In various embodiments, a deduplication system may deduplicate the ERM-protected data. Since data segments are encrypted in a manner dependent on their respective content, identical data segments may produce identical cipher-text, which may be deduplicated by a deduplication system.

Figure 1:
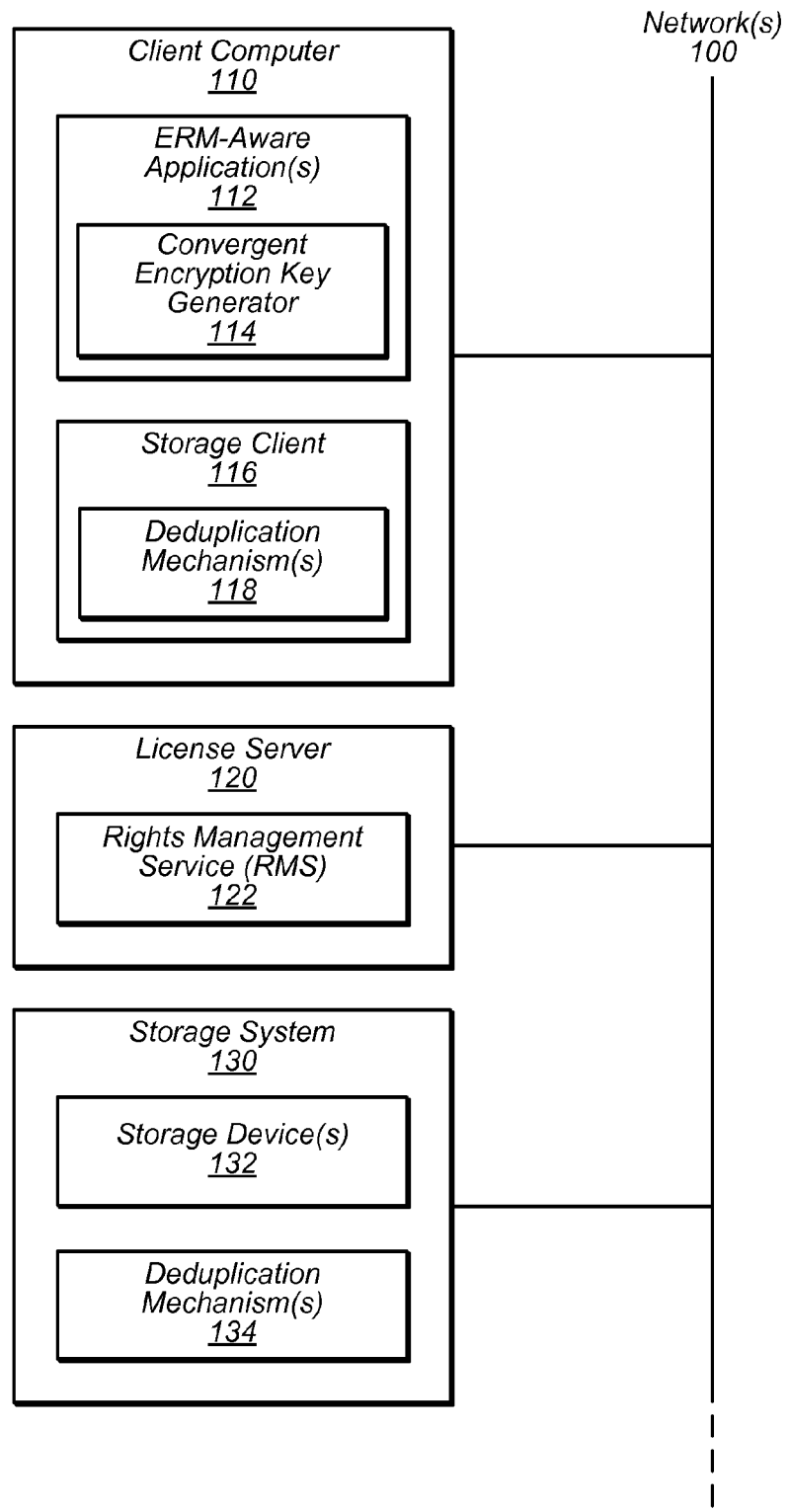
FIG. 1 is a block diagram illustrating an enterprise rights management system (ERM) and storage system configured to perform deduplication of ERM-protected data, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Some storage systems, such as backup or shared storage service systems, may store large amounts of data which may require significant storage resources. This data may include various files, any number of which may be protected by an enterprise rights management (ERM) system. An ERM system may encrypt and regulate access to the data it protects.

Deduplication of redundant data may reduce the amount of storage resources necessary to store data on storage systems. Data deduplication may involve reducing the number of copies of the same data that are stored by the storage system. For example, data deduplication may be used to achieve single-instance storage, in which only a single copy of each unique data item (e.g., a volume, file, database, or a portion of such a volume, file, or database) is maintained by the storage system.

Deduplication may be implemented by one or more deduplication mechanisms detecting attempts to store duplicate data and avoiding the redundant store. Such mechanisms may be implemented by a client application and/or by a storage system. For example, in one embodiment, a client application may be configured to determine whether or not given data is redundant in the target storage system before storing the data. If the data is redundant, the storage client may be configured to indicate to the storage system the user's interest in the data rather than storing the data again. In other examples, a storage client's attempt to store duplicate data may be detected and appropriately handled by the storage device itself. For example, the storage device may detect the duplicate storage attempt and register the user's interest in the data rather than store another copy.

One shortcoming of traditional ERM systems is the difficulty of performing deduplication with ERM-protected files. An ERM system may protect a given file by encrypting its contents with a strong encryption algorithm such that after the encryption algorithm is applied, the resulting encrypted file (i.e., cipher text) may appear essentially random and/or unrelated to the original data (i.e., clear text). Thus, if two identical files are encrypted by a traditional ERM system, the identical files may produce two different respective cipher texts. If a storage client attempts to store the two different cipher texts to a storage system, deduplication mechanisms on the storage client and/or storage system may be unable to detect that the two different cipher texts actually correspond to the same redundant data. Therefore, the use of traditional ERM to protect data may reduce the effectiveness of deduplication mechanisms and therefore increase storage space requirements.

Accordingly, in various embodiments, an ERM system as described herein may be configured to enable data deduplication of ERM-protected data. In some embodiments, the ERM system may be configured to encrypt data in a manner wherein redundant data is encrypted into redundant cipher text. For example, if two different files contain the same content before being encrypted (i.e., same clear text), then the ERM system may encrypt these two files into identical cipher texts. Thus, if an attempt is made to store the two identical cipher texts on a storage system, then one or more data deduplication mechanisms may recognize the two cipher texts as being redundant. The deduplication mechanisms may therefore perform any number of deduplication actions (e.g., avoid storing the data) and thereby reduce the storage space requirements for the storage system.

According to various embodiments, an ERM system may use convergent encryption to ensure that identical clear text is always encrypted into identical cipher text, as described above. As used herein, the term convergent encryption may refer to any encryption scheme whereby an encryption key used to encrypt given data is based on the given data itself. For example, the encryption key may be a hash of the data. In such a scheme, since the encryption key is based on the contents of the data, two clear texts are encrypted into identical cipher texts if and only if the two clear texts are identical.

FIG. 1 is a block diagram illustrating a network comprising an ERM system and a storage system, configured to implement deduplication on ERM-encrypted files, according to various embodiments. In FIG. 1, a client computer 110, a license server 120, and a storage system 130 are connected via one or more networks 100. Although the illustrated embodiment shows three systems, any number of components 110, 120, and/or 130 may be executing on a single computer system.

Client computer 110, a license server 120, and a storage system 130 may be connected using any combination of networks 100. For example, client computer 110 may be connected to license server 120 over a local Ethernet network while both are connected to storage system 130 over a wide area network (WAN) such as the Internet. In other embodiments, any number of these components may be on the same network and/or on the same computer.

In the illustrated embodiment, client computer 110 may be executing one or more ERM-aware applications 112. ERM-aware applications 112 may comprise any number of software programs with which a user may create and/or access ERM-protected data. A user may be motivated to protect a file using ERM if, for example, that file contains sensitive and/or proprietary information. In various embodiments, each ERM-aware application 112 may have access to one or more file systems and/or storage devices where ERM-protected data may be stored.

In some embodiments, ERM-aware applications 112 may comprise an encryption key generator, such as convergent encryption key generator 114. ERM-aware application 112 may use convergent encryption key generator 114 to generate convergent encryption keys for encrypting data as part of the ERM encryption process. For example, if a user creates a file and wishes to protect it using ERM, ERM-aware application 112 may use convergent encryption key generator 114 to generate a convergent key for the data and encrypt the data using that key. According to various embodiments, a convergent encryption key may be dependent on the content of the file.

In some embodiments, convergent encryption key generator 114 may be separate from any particular ERM-aware application 112. For example, a single convergent encryption key generator instance and/or application may be provided as a service and shared by any number of ERM-aware applications. In other embodiments, convergent encryption key generator 114 may be implemented in the form of a shared software library.

In addition to ERM-aware applications 112, client computer 100 may also comprise one or more storage clients 116, such as for a third-party storage service (e.g., Symantec™ Protection Network). Such a storage client may facilitate storing and/or accessing information on a storage system, such as 130.

Storage client 116 may include one or more deduplication mechanisms 118. Deduplication mechanisms 118 may be configured to detect when a store operation attempts to store redundant data. If such an attempt is detected, deduplication mechanisms 118 may be configured to not perform the store operation and/or to inform the target storage system of storage client 116 that the user using the storage client has an interest in the data.

In one embodiment, each piece of data (e.g., file, file segment) may be associated with an identifier. In various embodiments, the identifier may be assigned by the ERM system (e.g., ERM-aware applications 112) when the data is created and may be dependent on the contents of the data. For instance, the identifier may be calculated as a hash of the convergent encryption key. In such embodiments, the storage client 116 may use the identifier to query a target storage system, such as 130, regarding whether a copy of the data already exists on the storage system. If it does, then storage client 116 may avoid storing a redundant copy.

In various embodiments, storage client 116 and/or deduplication mechanisms 118 may exist on client computer 110 in different configurations. For example, one or more ERM-aware applications 112 may include and/or perform the functionality of storage client 116 and/or deduplication mechanisms 118. In other embodiments, storage client 116 may exist on a different computer than client computer 110. For example, storage client 116 may be executing on a server and may be accessed by ERM-aware applications 112 as a web service (e.g., SOAP) and/or via another web interface, such as an HTML interface.

In the illustrated embodiment, storage client 116 may use storage system 130 to store ERM-protected data and/or other data. Storage system 130 may comprise various types of storage systems and/or storage devices 132. For example, storage system 130 may comprise a backup storage system and/or a storage service system. Storage devices 132 may comprise any number of magnetic storage devices (e.g., disk drives, tape drives, etc.) or any other type of computer readable storage medium.

In some embodiments, ERM-aware applications 112 may store and retrieve data to and from storage system 130 using storage client 116. For example, in one embodiment, storage system 130 may comprise a storage service, such as the Symantec™ Protection Network. Such a storage service may provide storage capabilities to one or more clients. In such systems, the existence of multiple clients may be transparent to each client.

In some embodiments, storage system 130 may comprise a backup storage system. In such a system, ERM-aware applications may store data on one or more local storage devices and a backup storage program may later archive the data by coping it to storage system 130 using storage client 116. In various embodiments, such a backup storage program may be implemented as one or more components of storage system 130 and/or as separate components executing on various other systems (e.g., on client computer 110).

In order to conserve storage space, storage system 130 may include deduplication mechanisms, such as 134. Deduplication mechanisms 134 may perform data deduplication by detecting attempts to store redundant data (e.g., redundant files or parts of files that are replicated) and avoiding storing this data. In one example embodiment, deduplication mechanisms 134 may determine whether the data is redundant by examining its associated identifier, as provided by storage client 116, and determining if data by the same identifier is already stored. In various embodiments, storage system 130 may store data in a location dependent, at least in part, on its identifier.

In different embodiments, deduplication mechanisms may exist on storage client 116, storage system 130, or both. Additionally, deduplication mechanisms on the storage system, such as 134, may be provided as part of the storage subsystem itself and/or as part of other components.

According to various embodiments, ERM-aware applications 112 may encrypt data using one or more convergent encryption keys using convergent encryption key generator 114. Therefore, redundant ERM-protected data may comprise identical cipher text. Thus, deduplication mechanisms (e.g., 118, 134) may detect redundant data by detecting redundant cipher text. For example, in embodiments wherein an identifier is used to identify data, redundant data items may be associated with the same identifier since the identifier may be dependent on the data contents (e.g., based on the encryption key which is based on the data contents). Thus, deduplication mechanisms such as 118 and/or 134 may detect attempts to store duplicate data.

To implement an ERM system, various embodiments (such as that of FIG. 1) may include one or more licensing servers 120, which may provide one or more services, such as a rights management service (RMS) 122. RMS 122 may provide licensing and/or other services to ERM-aware applications 112. For example, if a user wishes to read and/or modify an ERM-protected file using an ERM-aware application 112, the ERM-aware application 112 may request a user license from RMS 122, as described in more detail below.

Figure 2:
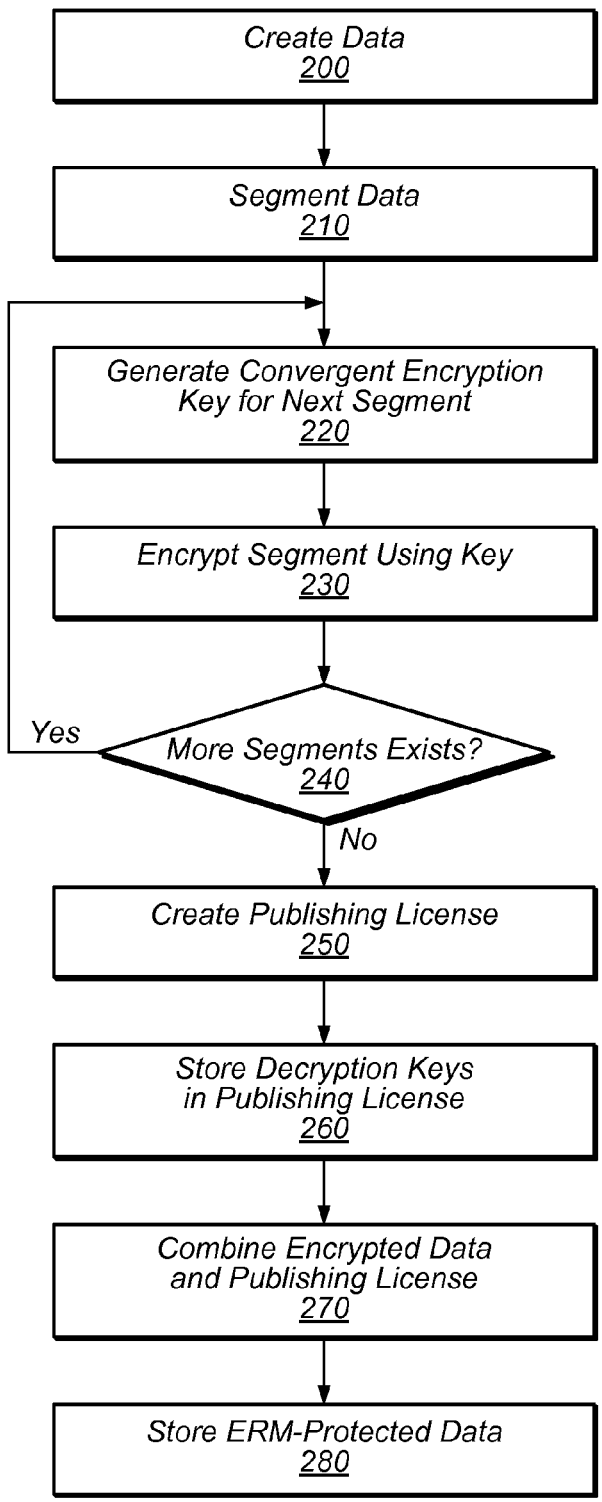
FIG. 2 is a flow diagram illustrating a method for creating and storing ERM-protected data that may be deduplicated by a deduplication system, according to one embodiment.

FIG. 2 is a flow diagram illustrating a method for creating and storing ERM-protected data with deduplication, according to one embodiment. For example, the illustrated method may be performed by an ERM-aware application, such as 112 of FIG. 1, using a storage client, such as 116 of FIG. 1.

The method of FIG. 2 may begin when a user creates data using an ERM-aware application, as in 200. For example, the user may create a word processing document that contains sensitive information, such as proprietary and/or personal data. In some embodiments, the user may instruct the ERM-aware application to protect the given data using ERM techniques.

According to various embodiments, the ERM-aware application may segment the data, as in 210. In various embodiments, the data may be segmented into one or more segments. In some embodiments, data may be segmented along boundaries that correspond to those used by a targeted deduplication mechanism. For example, a given deduplication mechanism may segment data along deduplication boundaries and perform deduplication on each segment individually. This may increase the efficiency of the deduplication, for instance, if only certain sections of a given file constitute redundant data. By segmenting the file, a deduplication mechanism may deduplicate the redundant parts rather than being forced to store the entire file. Deduplication boundaries may be chosen according to various schemes, such as fixed size chunks or variable sized chunks. In various embodiments, an ERM system may anticipate the deduplication boundaries that the deduplication mechanism will employ and segment data in 210 along the same or similar boundaries. Thus, according to some embodiments, an ERM system may enable one or more target deduplication mechanisms to identify redundant data in file segments more effectively.

According to the illustrated embodiment, the ERM-aware application may then generate a convergent encryption key for each data segment and encrypt the segment using its respective convergent encryption key. For each segment, the application generates a convergent encryption key based on the contents of the segment itself (as in 220) and encrypts the segment using its respective convergent encryption key, as in 230. In some embodiments, this may be done by the ERM-aware application directly while in others, encryption may be provided by one or more other components and/or services available to the ERM-aware application.

As described earlier, a convergent encryption key may be dependent on the data itself. For example, if two segments contain identical data, then both may correspond to the same convergent encryption key or keys. Various key-based encryption algorithms may be used to perform the encryption of 230, such as 3DES, AES, or other algorithms. In various embodiments, symmetric encryption algorithms may be used. As used herein, the term symmetric encryption may refer to any encryption scheme wherein the encryption key is the same, or substantially similar to, the decryption key. It is noted, however, that other embodiments may be possible that employ asymmetric encryption (asymmetric encryption requires a different key to encrypt data than to decrypt the same data).

In some embodiments, the ERM-aware application may generate an identifier for each data segment, as discussed above. Such a data identifier may be used by a deduplication mechanism to determine if a copy of the corresponding data is already stored in the storage system. According to various embodiments, such an identifier may be dependent on the contents of each data segment. In some embodiments, the identifier may be calculated as a function of the encryption key. In such embodiments, if the encryption key is dependent on the data, an identifier dependent on the encryption key is likewise dependent on the data.

While more segments exist, the ERM-aware application may continue to generate convergent encryption keys for each segment and encrypt each segment with its respective encryption key, as indicated by the feedback loop from 240 to 220.

Once all the data has been encrypted and no more segments exist, as indicated by the negative exit from 240, the application may create a publishing license for the data, as in 250. In various embodiments, such a publishing license may indicate various access rights, such as which other users and/or groups may access the data and/or the manner in which they may access the data. In some embodiments, the user may specify different types of access rights for different users and/or groups. For example, a user may specify that a given group of users may only read the data, but not modify it, while another group of users may both read and modify the data. In some embodiments, a publishing license may be described using a standard format, such as Extensible Rights Markup Language (XrML) or similar method.

In some embodiments, the publishing license may include one or more decryption keys and/or identifiers corresponding to segments of the data, as in 260. As described above, in various embodiments a symmetric encryption algorithm may be used to encrypt the data in 230. Accordingly, the decryption key for the encrypted data may be the same as the convergent encryption key used to encrypt the data.

In various embodiments, the publishing license may itself be encrypted so as to make it immutable and/or unreadable by unauthorized users and/or components. For example, in one embodiment, the publishing license may be encrypted using a public key of a licensing server (e.g., RMS 122), using an asymmetric encryption scheme, such as RSA. That is, the publishing license may be encrypted such that only the RMS may decrypt and read it.

According to the illustrated embodiment, after the data is encrypted into cipher text using one or more convergent encryption keys (as in 220-240) and a publishing license for the data is created and encrypted (as in 250-260), the encrypted data and publishing license may be combined into a single ERM-protected file, as in 270.

In the illustrated embodiment, the ERM-protected file may be stored on one or more storage systems, as in 280. In various embodiments, this may include using a storage client, such as 116. In some embodiments, the ERM-aware application may notify the storage client of the segments to store. In some embodiments, deduplication mechanisms, such as 118 and/or 134 of FIG. 1, may determine if any of the segments are redundant, such as by examining the respective identifier of each segment.

Figure 3:
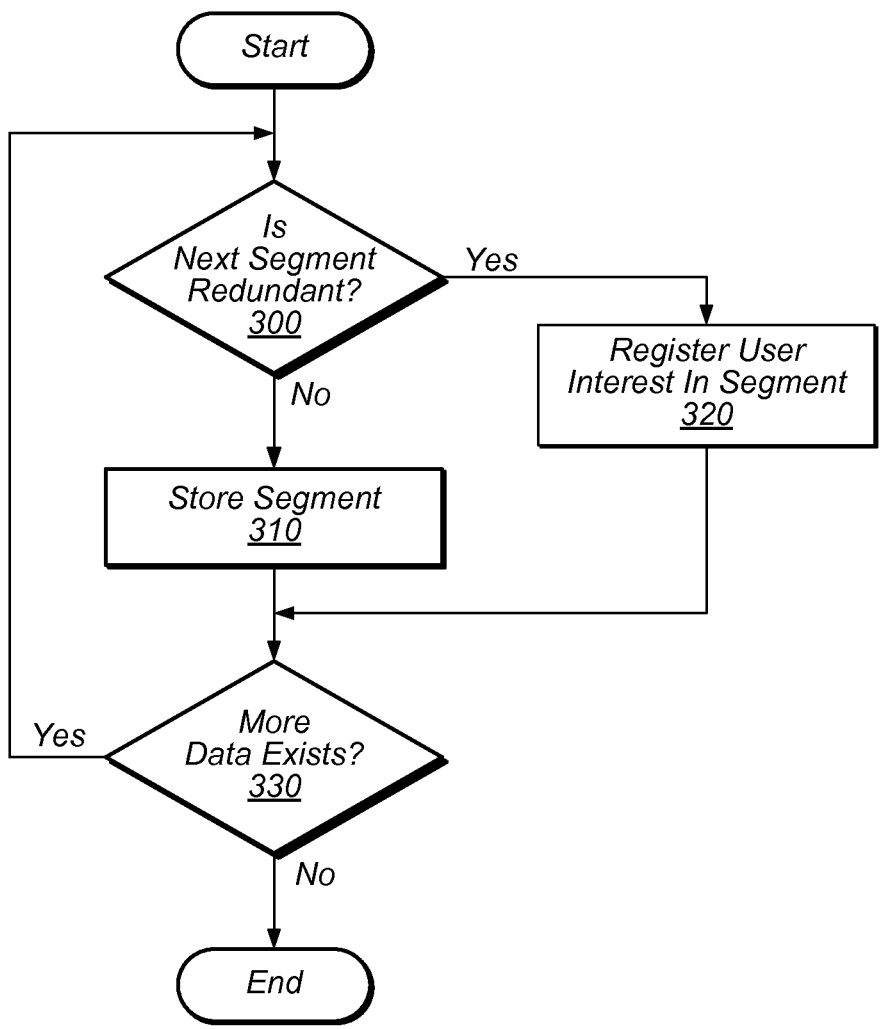
FIG. 3 is a flow diagram illustrating a method for performing deduplication of multiple data segments, according to one embodiment.

FIG. 3 is a flow diagram illustrating a method for performing deduplication on ERM-protected data, according, according to one embodiment. The method may be performed by one or more deduplication mechanisms (e.g., 118, 134 of FIG. 1). For example, the illustrated method may be performed by a storage client storing data, as in 280 of FIG. 2.

In the illustrated method of FIG. 3, the storage client determines if each segment is redundant, as in 300. In some embodiments, the storage client may query the storage system to determine if a given segment is redundant, such as by using an identifier corresponding to the segment. If the segment is not redundant, as indicated by the negative exit from 300, the storage client may be configured to store the data segment, as in 310.

However, if the data segment is redundant, as indicated by the affirmative exit from 300, the storage client may avoid storing the redundant data. In some embodiments, such as those wherein the target storage system is a storage service, in response to detecting that the data segment is redundant, the storage client and/or storage system may register the storage client's (or active user's) interest in the given data segment, as in 320. For example, registering an interest in the item may indicate to the storage system that more than one client is interested in the data segment. In some storage systems, the encrypted copy of such a data segment is not be deleted from the storage system unless no clients are registered as interested in the data segment.

In one embodiment, registering an interest in a data segment may comprise sending an identifier associated with the segment to the storage system. In some embodiments, the storage system may respond by incrementing a counter associated with the segment. In further embodiments, each time a client attempts to delete a data segment, the storage system may decrement the counter without actually deleting the item unless the counter has already reached a minimum value. If the counter reaches the minimum value, the storage system may delete the item. Alternative techniques for registering an interest in data can include specifying a minimum storage time (e.g., one year) for the particular data.

In the illustrated embodiment of FIG. 3, once the data segment has been stored to the storage system (as in 310) or the storage client's interest has been registered in the data segment (as in 320), the storage client may check if more data segments exist, as in 330. If more segments exist for storage, as indicated by the affirmative exit from 330, then the storage client may check if the next segment is redundant, as indicated by the feedback loop to 300. Otherwise, if no more segments exist for storage, as indicated by the negative exit from 330, then the illustrated storage process ends.

Figure 4:
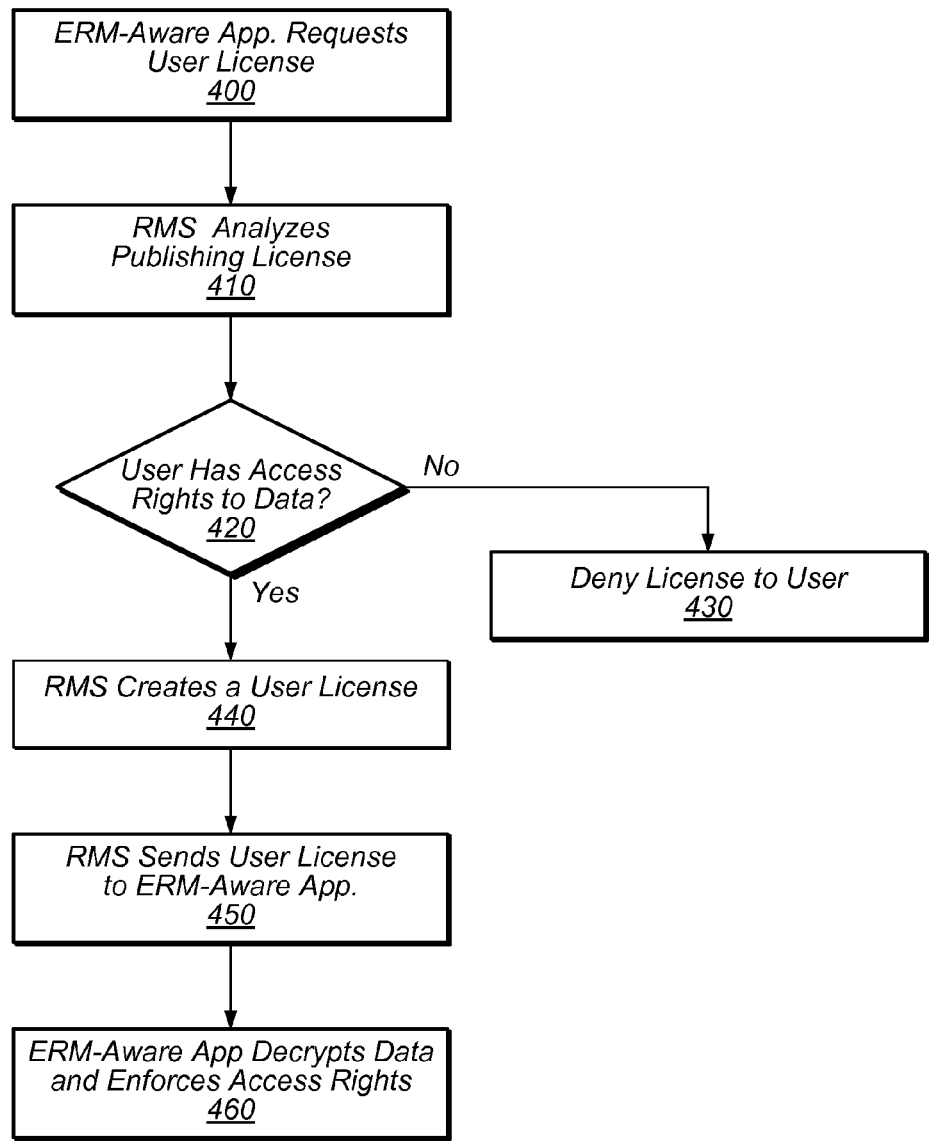
FIG. 4 is a flow diagram illustrating a method for accessing ERM-protected data, according to one embodiment.

FIG. 4 is a flow diagram illustrating a method for accessing ERM-protected data, according to one embodiment. In some embodiments, the method may be performed by an ERM-aware application in coordination with an RMS. The illustrated method may be performed in response to a user attempting to access ERM-protected data.

In the method of FIG. 4 an ERM-aware application may request a user license for the ERM-protected data from an RMS, as in 400. In various embodiments, such a request may identify the user of the ERM-aware application (i.e., the principal). In various embodiments, the request may include the publishing license of the ERM-protected data. In some embodiments, the request may comprise a public encryption key of the ERM-aware application for the licensing server to use for encrypting communications with the ERM-aware application.

According to the illustrated embodiment, the RMS may receive and analyze the request, as in 410. For example, in 410, if the public key of the RMS was used to encrypt the publishing license then the RMS may decrypt the publishing license using its private key. The RMS may then analyze the decrypted publishing license to determine if the given principal may access the data, as in 420. If the publishing license does not permit the user to access the data, as indicated by the negative exit from 420, the RMS may deny a user license to the principal, as in 430. However, if the user license does permit the principal to access the data, as in the affirmative exit from 420, then the RMS may create a user license, as in 440, and sent it to the requesting ERM-aware application, as in 450.

In various embodiments, the user license may include a decryption key for the data. In some embodiments, the RMS may encrypt the user license before sending it to the requesting application. For example, if the ERM-aware application supplied a public encryption key with the request of 400, the RMS may encrypt the user license using this key before sending it to the requesting application.

In the illustrated embodiment, once the ERM-aware application receives the user license, it may gain access to the data decryption key, decrypt the data, and enforce access rights to the data dependent on the publishing license, as in 460. For example, if the publishing license indicates that the principal may read and modify the data, then the ERM-aware application may allow the principal to modify the data. In other examples, the publishing license may indicate that the principal may be granted read-only access to the data or may access and/or modify only parts of the data. In such instances, the ERM-aware application may enforce those limitations as well.

Figure 5:
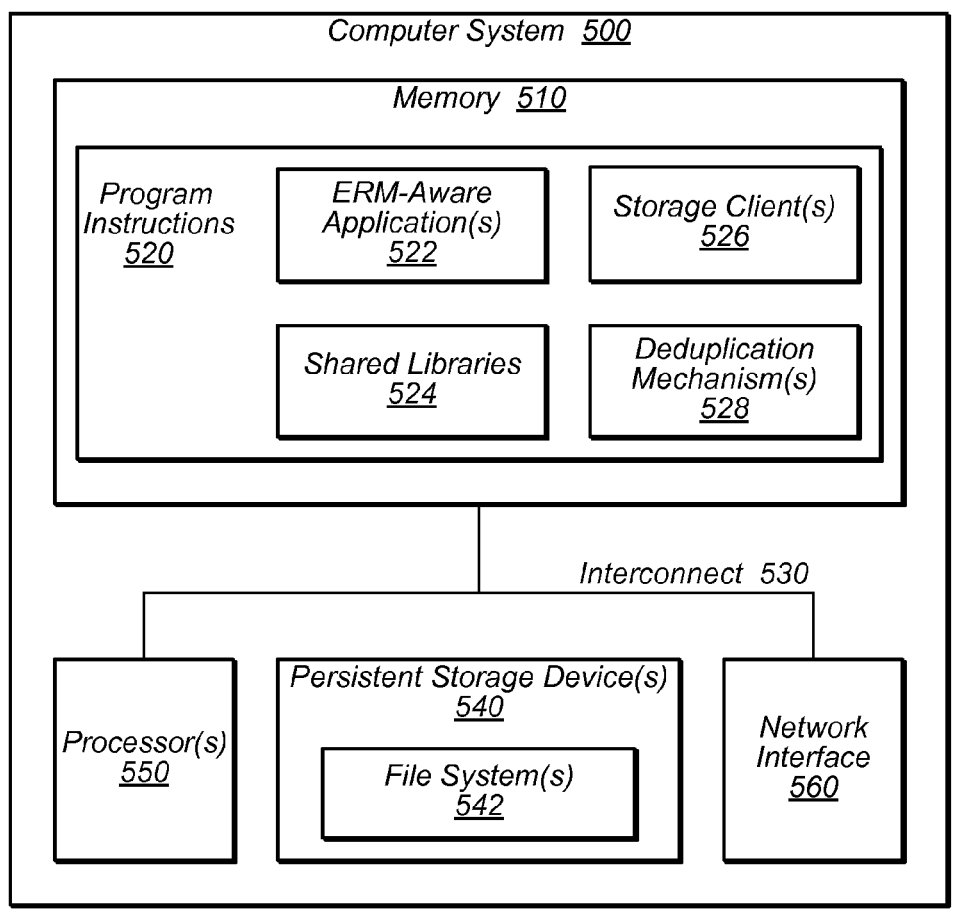
FIG. 5 is a block diagram illustrating a computer system configured to implement an ERM system that enables deduplication of ERM-protected data, according to various embodiments.

FIG. 5 illustrates a computer system configured to implement an ERM system as described above with reference to FIGS. 1-4 for controlling access to sensitive data, according to various embodiments. Computer system 500 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Computer system 500 may include one or more processors 550, each of which may include multiple cores, any of which may be single or multi-threaded. The computer system 500 may also include one or more persistent storage devices 540 (e.g. optical storage, magnetic storage, hard drive, tape drive, solid state memory, etc), which may store data implementing one or more file systems 542. File systems 542 may store ERM-protected data. A deduplication mechanism may be configured to perform deduplication on data stored in persistent storage devices 540 and/or file systems 542, as described herein.

Computer system 500 may include one or more memories 510 (e.g., one or more of cache, SRAM, DRAM, RDRAM, EDO RAM, DDR 10 RAM, SDRAM, Rambus RAM, EEPROM, etc.). Computer system 500 may include one or more network interfaces 560 for transmitting and receiving data. For example, a data backup program may transmit data to a backup storage system using network interface 560. Various embodiments may include fewer or additional components not illustrated in FIG. 5 (e.g., video cards, audio cards, additional network interfaces, peripheral devices, a network interface such as an ATM interface, an Ethernet interface, a Frame Relay interface, etc.)

The one or more processors 550, storage device(s) 540, network interface 560 and system memories 510 may be coupled to system interconnect 530. One or more of the system memories 510 may contain program instructions 520. Program instructions 520 may be encoded in platform native binary, any interpreted language such as Java™ byte-code, or in any other language such as C/C++, Java™, etc or in any combination thereof.

Program instructions 520 may include program instructions executable to implement one or more ERM-aware applications 522 for storing and/or accessing ERM-protected data, as described herein. According to the illustrated embodiment, program instructions 520 may also be executable to implement one or more shared libraries, such as 524. For example, shared libraries 524 may comprise a convergent encryption key generator, as described herein. In other embodiments, a convergent encryption key generator component may be implemented as part of one or more ERM-aware applications 522, as shown by elements 112 and 114 in FIG. 1.

In various embodiments, the program instructions 520 may be executable by the processor(s) to implement one or more storage clients 526 for storing and/or retrieving ERM-protected data from one or more storage systems. Storage client 526 may be configured to perform deduplication of data, as described herein.

Program instructions 520 may also be executable by the one or more processors to implement one or more deduplication mechanisms 528, configured to perform deduplication of ERM-encrypted data as described herein. For example, in some embodiments, deduplication mechanisms 528 may be configured to determine whether a target storage system already stores a copy of data that a given client is attempting to store. In various embodiments, deduplication mechanisms 528 may comprise subcomponents of ERM-aware applications 522, shared libraries 524, and/or storage clients 526.

The ERM system and mechanisms described herein for assigning and enforcing access rights to data may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

Although the embodiments above have been described in considerable detail, numerous variations and modifications will become apparent to those skilled in the art once the above disclosure is fully appreciated. For example, in various embodiments, instead of encrypting identical data into identical cipher texts, the ERM system may produce cipher texts that are different, but have some other property in common that a deduplication system may recognize as indicative of given data. It is intended that the following claims be interpreted to embrace all such variations and modifications.

What is claimed:

1. A method comprising:
 a computer system segmenting data into one or more data segments, wherein said segmenting is dependent on an indication from a deduplication system that at least one of the one or more data segments are already stored on a storage system;
 the computer system encrypting each data segment using a respective encryption key, wherein different data segments are encrypted using different encryption keys, wherein the respective encryption key used to encrypt each data segment is dependent on the content of the data segment;
 the computer system generating a publishing license associated with the data, the publishing license including:
  information identifying users with access rights to the data, the access rights enforced by an enterprise rights management system; and
  for each data segment, a respective decryption key usable to decrypt the data segment;
 the computer system storing the publishing license on a storage device, including storing the information identifying the users with access rights to the data and storing the respective decryption key for each data segment;
 subsequently to said storing the publishing license, the computer system receiving a request for access to the data by a particular user; and in response to the request, the computer system retrieving the publishing license from the storage device and analyzing the publishing license to determine whether to grant the particular user access to the data.

2. The method of claim 1, wherein said segmenting is dependent on a segmentation scheme used by a deduplication system.

3. The method of claim 1, further comprising:
subsequent to said encrypting, the computer system attempting to store a data segment of the one or more data segments to the storage system;
in response to said attempting, receiving from a deduplication mechanism an indication that a copy of the encrypted data segment is not already stored on the storage system;
in response to said indication, the computer system storing the encrypted data segment on the storage system.

4. The method of claim 3, wherein the storage system comprises a third-party storage service.

5. The method of claim 1, further comprising:
subsequent to said encrypting, the computer system attempting to store a data segment of the one or more data segments to the storage system;
in response to said attempting, receiving from a deduplication mechanism an indication that a copy of the encrypted data segment is already stored on the storage system;
in response to said indication, the computer system registering an interest in the encrypted data segment with the storage system.

6. The method of claim 1, wherein for each data segment, the respective encryption key is identical to the respective decryption key.

7. The method of claim 1, further comprising:
associating each of the one or more data segments with a respective identifier, the respective identifier being dependent on content of a respective data segment.

8. A non-transitory computer-readable storage medium, storing program instructions executable by a computing device to implement:
segmenting data into one or more data segments, wherein said segmenting is dependent on an indication from a deduplication system that at least one of the one or more data segments are already stored on a storage system;
encrypting each data segment using a respective encryption key, wherein the program instructions are executable by the computing device to encrypt different data segments using different encryption keys, wherein the respective encryption key used to encrypt each data segment is dependent on the content of the data segment;
generating a publishing license associated with the data, the publishing license including:
information identifying users with access rights to the data, the access rights enforced by an enterprise rights management system; and
for each data segment, a respective decryption key usable to decrypt the data segment;
storing the publishing license on a storage device, including storing the information identifying the users with access rights to the data and storing the respective decryption key for each data segment;
subsequently to said storing the publishing license, receiving a request for access to the data by a particular user; and in response to the request, retrieving the publishing license from the storage device and analyzing the publishing license to determine whether to grant the particular user access to the data.

9. The computer-readable storage medium of claim 8, wherein said segmenting is dependent on a segmentation scheme used by a deduplication system.

10. The computer-readable storage medium of claim 8, wherein the program instructions are further executable by the computing device to implement:
subsequent to said encrypting, attempting to store a data segment of the one or more data segments to the storage system;
in response to said attempting, receiving from a deduplication mechanism an indication of whether a copy of the encrypted data segment is already stored on the storage system;
in response to determining that a copy of the encrypted data segment is not already stored on the storage system, storing the encrypted data segment on the storage system; and
in response to determining that a copy of the encrypted data segment is already stored on the storage system, registering an interest in the encrypted data segment with the storage system.

11. The computer-readable storage medium of claim 8, wherein for each data segment, the respective encryption key is identical to a respective decryption key.

12. The computer-readable storage medium of claim 8, wherein the program instructions are further executable by the computing device to implement:
associating each of the one or more data segments with a respective identifier, the respective identifier being dependent on content of a respective data segment.

13. A computer system comprising:
one or more processors;
a memory coupled to the one or more processors and storing program instructions executable by the one or more processors to implement:
segmenting data into one or more data segments, wherein said segmenting is dependent on an indication from a deduplication system that at least one of the one or more data segments are already stored on a storage system;
encrypting each data segment using a respective encryption key, wherein the program instructions are executable by the one or more processors to encrypt different data segments using different encryption keys, wherein the respective encryption key used to encrypt each data segment is dependent on the content of the data segment;
generating a publishing license associated with the data, the publishing license including:
information identifying users with access rights to the data, the access rights enforced by an enterprise rights management system; and
for each data segment, a respective decryption key usable to decrypt the data segment;
storing the publishing license on a storage device, including storing the information identifying the users with access rights to the data and storing the respective decryption key for each data segment;
subsequently to said storing the publishing license, receiving a request for access to the data by a particular user; and in response to the request, retrieving the publishing license from the storage device and analyzing the publishing license to determine whether to grant the particular user access to the data.

14. The computer system of claim 13, wherein said segmenting is dependent on a segmentation scheme used by a deduplication system.

15. The computer system of claim 13, wherein the program instructions are further executable by the one or more processors to implement:

subsequent to said encrypting, attempting to store a data segment of the one or more data segments to the storage system;

in response to said attempting, receiving from a deduplication mechanism an indication of whether a copy of the encrypted data segment is already stored on the storage system;

in response to determining that a copy of the encrypted data segment is not already stored on the storage system, storing the encrypted data segment on the storage system; and in response to determining that a copy of the encrypted data segment is already stored on the storage system, registering an interest in the encrypted data segment with the storage system.

16. The computer system of claim 13, wherein for each data segment, the respective encryption key is identical to a respective decryption key.

17. The computer system of claim 13, wherein the program instructions are further executable by the one or more processors to implement:

associating each of the one or more data segments with a respective identifier, the respective identifier being dependent on content of a respective data segment.

\* \* \* \* \*